United States Patent
Juni

(10) Patent No.: US 9,910,409 B2
(45) Date of Patent: Mar. 6, 2018

(54) EXHIBITION DEVICE AND VIDEO PICTURE EXHIBITION METHOD

(71) Applicant: NITTO DENKO CORPORATION, Ibaraki-shi, Osaka (JP)

(72) Inventor: Noriyuki Juni, Ibaraki (JP)

(73) Assignee: NITTO DENKO CORPORATION, Ibaraki-Shi (JP)

( * ) Notice: Subject to any disclaimer, the term of this patent is extended or adjusted under 35 U.S.C. 154(b) by 260 days.

(21) Appl. No.: 14/894,872

(22) PCT Filed: May 21, 2014

(86) PCT No.: PCT/JP2014/063426
§ 371 (c)(1),
(2) Date: Nov. 30, 2015

(87) PCT Pub. No.: WO2014/196356
PCT Pub. Date: Dec. 11, 2014

(65) Prior Publication Data
US 2016/0116886 A1    Apr. 28, 2016

(30) Foreign Application Priority Data

Jun. 7, 2013 (JP) ................................ 2013-120847

(51) Int. Cl.
*H04N 5/89* (2006.01)
*H04N 13/00* (2006.01)
(Continued)

(52) U.S. Cl.
CPC ......... *G03H 1/0005* (2013.01); *G02B 17/002* (2013.01); *G02B 27/2292* (2013.01);
(Continued)

(58) Field of Classification Search
USPC ................................................. 386/358–362
See application file for complete search history.

(56) References Cited

U.S. PATENT DOCUMENTS

2001/0022562 A1    9/2001    Ishikawa
2001/0022563 A1    9/2001    Ishikawa
(Continued)

FOREIGN PATENT DOCUMENTS

JP    2001-255493 A    9/2001
JP    2001-255494 A    9/2001
(Continued)

OTHER PUBLICATIONS

Notification of Transmittal of Translation of the Internationational Preliminary Report om Patentability (Form PCT/IB/338) issued in counterpart International Application No. PCT/JP2014/063426 dated Dec. 17, 2015 with Forms PCT/IB/373 and PCT/ISA/237. (6 pages).

(Continued)

*Primary Examiner* — Hung Dang
(74) *Attorney, Agent, or Firm* — Westerman, Hattori, Daniels & Adrian, LLP

(57) ABSTRACT

In an exhibition device and a video picture exhibition method according to the present invention, at least one exhibition object for reinforcing the three-dimensional effect of a spatial image is disposed in a region other than an upper surface of an image-forming optical element (micromirror array) in an upper surface of an enclosure (case) of the device and at a position where a distance from the center of a virtual display area of the spatial image projected from a display to over the enclosure thereto is not greater than a diagonal length of the virtual display area or at a position where the distance is not greater than a maximum diameter of the virtual display area. This achieves the effective display of an impressive two-dimensional video picture appearing three-dimensional in association with the exhibition object disposed on the upper surface.

11 Claims, 14 Drawing Sheets

(51) Int. Cl.
  G03H 1/00    (2006.01)
  G09F 19/18   (2006.01)
  G02B 17/00   (2006.01)
  G02B 27/22   (2018.01)
  G03H 1/22    (2006.01)

(52) U.S. Cl.
  CPC ......... *G03H 1/2205* (2013.01); *G03H 1/2249* (2013.01); *G09F 19/18* (2013.01); *G03H 2001/0088* (2013.01)

(56) References Cited

U.S. PATENT DOCUMENTS

| | | | |
|---|---|---|---|
| 2004/0217920 | A1 | 11/2004 | Ishikawa |
| 2008/0218854 | A1* | 9/2008 | Hoshino ............ G02B 27/2235 359/462 |
| 2010/0231860 | A1 | 9/2010 | Maekawa |
| 2011/0074657 | A1* | 3/2011 | Sugiyama .......... G02B 27/0101 345/7 |
| 2012/0140325 | A1* | 6/2012 | Sugiyama ............. G02B 5/136 359/546 |
| 2012/0268640 | A1 | 10/2012 | Shimatani et al. |
| 2012/0313839 | A1* | 12/2012 | Smithwick ......... G02B 27/2214 345/6 |
| 2017/0017089 | A1* | 1/2017 | Kim .................... G02B 27/2292 |

FOREIGN PATENT DOCUMENTS

| | | |
|---|---|---|
| JP | 2001-330916 A | 11/2001 |
| JP | 2011-081296 A | 4/2011 |
| WO | 2007/116639 A1 | 10/2007 |
| WO | 2011/052588 A1 | 5/2011 |

OTHER PUBLICATIONS

Office Action dated Nov. 15, 2016, issued in counterpart Japanese Patent Application No. 2013-120847, with English translation. (6 pages).

International Search Report dated Jul. 22, 2014, issued in counterpart Application No. PCT/JP2014/063426 (1 page).

* cited by examiner

EXHIBITION DEVICE AND VIDEO PICTURE EXHIBITION METHOD

TECHNICAL FIELD

The present invention relates to an exhibition device and a video picture exhibition method which display a video picture such as a still picture and a moving picture as a two-dimensional video picture appearing three-dimensional and floating up in space in a manner rich in three-dimensional effect between exhibition objects disposed on an upper surface of an enclosure.

BACKGROUND ART

There has been proposed an image display device which includes: an image display surface (liquid crystal display panel and the like) for displaying an image including a three-dimensional image; and an image transmission panel (image-forming optical element) provided on the near side (viewer side) of the image display surface in spaced apart relation to the display surface and for forming the aforementioned image (spatial image) in space (see PTL 1, for example).

This image display device is provided with a pair of microlens arrays (image-forming optical element) positioned in a parallel spaced-apart relation to the image display surface and including a plurality of convex lenses (unit optical elements) disposed adjacent to each other in a matrix on opposite surfaces. Using the image-forming function of the microlens arrays, the image display device is capable of projecting (forming) an erect image of unity magnification corresponding to the aforementioned image in a space opposite from the aforementioned display surface (in a position opposite from the display surface with respect to the element surface of the image-forming optical element).

There has been proposed another example in which a three-dimensional frame of an aquarium and the like containing water is disposed around a position at which an erect image (spatial image) of unity magnification corresponding to the aforementioned image is formed, and in which an aquatic plant, a rock and the like are placed near (in front of and behind) the formed image. In this example, an object (aquatic animal) like a fish is projected between the aquatic plant and the rock, whereby a virtual aquarium is reproduced (see PTL 2, for example).

However, the aforementioned formed image (spatial image) is projected directly in front of a microlens array in the aforementioned image display device. For appropriate viewing of this spatial image, it is necessary that a viewer, the microlens array and the image display surface are arranged in a straight line. This is disadvantageous in that it is difficult to obtain a three-dimensional effect, a sense of realism and the like.

On the other hand, the present applicant proposes a display device which includes a flat panel display such as an LCD, and a planar image-forming optical element (micromirror array, see PTL 3) including a multiplicity of recessed unit optical elements or protruding unit optical elements arranged in an array and each having two mirror surfaces (corner reflectors) orthogonal to each other in Japanese Patent Application No. 2012-249682, Japanese Patent Application No. 2012-259047, Japanese Patent Application No. 2012-283072 and the like.

As shown in FIG. 18, this display device is configured such that the flat panel display (referred to hereinafter as a display D) is disposed on a second surface side of (under) the image-forming optical element, with a display surface Da of the display D inclined at a predetermined angle α (not less than 30° and less than 90°) with respect to an element surface (P) of the image-forming optical element (micromirror array M). Thus, the display device is capable of sharply displaying a spatial image (I') standing up obliquely toward the front side (viewer side) on a first surface side of the image-forming optical element (over the device) in a manner floating up from the upper surface of the image-forming optical element. In FIG. 18, a plane (frame indicated by dash-double-dot lines) designated by the reference character V represents a displayable range of the spatial image I' (that is, "virtual display area" of the spatial image I') projected from the display D.

RELATED ART DOCUMENT

Patent Documents

PTL 1: JP-A-2001-255493
PTL 2: JP-A-2001-255494
PTL 3: WO 2007/116639

SUMMARY OF INVENTION

When in personal use, the three-dimensional display devices as described above give a strong impression which is not made by conventional flat panel displays such as LCDs, PDPs and ELs. In light of advertisements and exhibitions (signage) in storefronts and the like and commercial use in presentations and the like, improvements in impact and in eye-catching effect are, however, required for the three-dimensional display devices.

Also, when such a three-dimensional display device is used for advertisements and exhibitions (signage) in storefronts and for display (sales) of merchandise and the like, the exhibition of the three-dimensional display device together with actual commodities (goods or exhibition objects) provides higher levels of persuasiveness and appeal to consumers (customers) than the use of the three-dimensional display device (video picture) alone. For this reason, there are cases in which the video pictures as described above are displayed (exhibited) in combination with the exhibition objects. Thus, a video picture exhibition method and an exhibition device which are capable of making an effective appeal in conjunction with the aforementioned exhibition objects will further increase advertising effectiveness to the customers.

In view of the foregoing, it is therefore an object of the present invention to provide an exhibition device and a video picture exhibition method which are capable of effectively displaying an impressive two-dimensional video picture appearing three-dimensional in conjunction with an exhibition object disposed on an upper surface of the exhibition device.

To accomplish the aforementioned object, a first aspect of the present invention is intended for an exhibition device comprising: an image-forming optical element provided in light-transmissive fashion in an upper surface of an enclosure for housing a display; a display disposed under the image-forming optical element and including a display surface in an attitude inclined at a predetermined angle with respect to a lower surface of the image-forming optical element; and at least one exhibition object disposed on the upper surface of the enclosure, the exhibition device being configured to image-form a video picture displayed on the display surface of the display through the image-forming optical element as a spatial image standing up obliquely in a virtual display area defined at a spatial position symmetrical to the display surface with respect to the plane of an element surface of the image-forming optical element, thereby displaying the spatial image in association with the at least one exhibition object, the at least one exhibition object on the upper surface of the enclosure being disposed in a region other than the upper surface of the image-forming optical element and at a position satisfying $$L \leq X \quad (1)$$

where L is a shortest distance between the center of the virtual display area and the at least one exhibition object, and X is a longer one of a diagonal length of the virtual display area and a maximum diameter of the virtual display area.

A second aspect of the present invention is intended for a method of exhibiting a video picture, comprising the step of image-forming a video picture displayed on a display surface of a display disposed in a downwardly inclined attitude under an image-forming optical element provided in light-transmissive fashion in an upper surface of an enclosure through the image-forming optical element as a spatial image standing up obliquely in a virtual display area defined in space over the enclosure in corresponding relation to the display surface to exhibit the spatial image in conjunction with at least one exhibition object disposed on the upper surface of the enclosure, the at least one exhibition object for reinforcing the three-dimensional effect of the spatial image being disposed and exhibited in a region other than the upper surface of the image-forming optical element in the upper surface of the enclosure so as to satisfy $$L \leq X \quad (1)$$

where L is a shortest distance between the center of the virtual display area and the at least one exhibition object, and X is a longer one of a diagonal length of the virtual display area and a maximum diameter of the virtual display area.

The present inventor has made studies to solve the aforementioned problem. As a result, the present inventor has found that, when a three-dimensional distance between the spatial image over the enclosure which is obtained by image-forming the video picture on the display and the exhibition object disposed around the spatial image is a short distance not greater than a given fixed distance, binocular parallax is prone to be caused between the exhibition object and the spatial image to thereby allow a viewer to feel the spatial image more three-dimensionally. However, it is in practice difficult to precisely set the distance between the spatial image and the exhibition object because the spatial image varies in size (area) depending on the image and video picture (moving picture) displayed on the display. Then, the present inventor has found that anyone can constantly feel improvements in the three-dimensional effect of the spatial image by using "an area where a spatial image is expected to be image-formed" (that is, "virtual display area" in space) which is uniquely definable based on a positional relationship between the display surface of the display and the image-forming optical element and which is not varied in size and shape as a base point and a reference (diagonal length and the like) for the measurement of the distance between the spatial image and the exhibition object, and by suitably setting a positional relationship between the central point of the virtual display area (plane) and the exhibition object. Hence, the present inventor has attained the present invention.

The "virtual display area" as used in the present invention has substantially the same shape as the planar shape of the display surface (or the "largest area usable for display" on the display surface) of the display for use in displaying the video picture which is projected to image-form the spatial image. In particular, when a unity-magnification image-forming optical element such as a micromirror array is used as the image-forming optical element, the virtual display area has exactly the same shape as the displayable area of the display surface of the display. In general, a display having a rectangular or square display surface the size (screen size in inches) of which is determined by the diagonal length of the display surface is frequently used as the display.

The "center of the virtual display area" as used in the present invention is as follows. For a rectangular or square virtual display area as described above, a point of intersection of diagonal lines thereof is used as the central point. For a circular or elliptical virtual display area and the like, the center of curvature (a point of intersection of a maximum diameter line and a minimum diameter line) thereof is used as the central point. For other polygonal or deformed shapes, a point of intersection of a maximum diameter line and a minimum diameter line or the barycenter of the area of the entire shape may be used as the center of the virtual display area.

The exhibition device according to the present invention includes the image-forming optical element provided in light-transmissive fashion in the upper surface of the enclosure for housing the display; and the display disposed under the image-forming optical element and including the display surface in an attitude inclined at the predetermined angle with respect to the lower surface of the image-forming optical element. The at least one "exhibition object for reinforcing the three-dimensional effect" is disposed at a position (satisfying Equation (1) below) where the distance from the center of the virtual display area of the spatial image projected from the display to over the enclosure is not greater than the diagonal length of the virtual display area or the maximum diameter of the area.

$$L \leq X \quad (1)$$

where L is the shortest distance between the center of the virtual display area and the at least one exhibition object, and X is a longer one of the diagonal length of the virtual display area and the maximum diameter of the virtual display area.

Thus, the exhibition device according to the present invention is capable of displaying the video picture displayed on the display as a two-dimensional video image richer in three-dimensional effect and in sense of realism in association with the at least one exhibition object. Also, the exhibition device according to the present invention may serve as an exhibition device which in particular provides high levels of persuasiveness and appeal to customers for advertisements and exhibition and for commercial use in presentations and the like.

The exhibition device according to the present invention wherein the at least one exhibition object includes a plurality of exhibition objects and at least one pair of the exhibition objects is disposed at left-hand and right-hand positions symmetrical to each other with respect to a center line of the virtual display area as viewed in a leftward/rightward direction is capable of constantly improving the three-dimensional effect of the spatial image, independently of the shape, size and the like of the spatial image.

In particular, the exhibition device according to the present invention wherein the image-forming optical element is a micromirror array including corner reflector type unit optical elements is capable of displaying the spatial image as a sharp video picture with a higher luminance, and is also capable of setting an ideal optical path such that a frame, the enclosure and the like of the device do not come into the field of view of a viewer.

The exhibition device according to the present invention wherein the inclination angle of the display surface of the display is not less than 30° and less than 90° with respect to the lower surface of the image-forming optical element is capable of displaying the displayed spatial image (two-dimensional video picture appearing three-dimensional) as a three-dimensional video picture with a stronger sense of floating.

Next, the video picture exhibition method according to the present invention is the method of exhibiting a video picture which comprises the step of image-forming the video picture displayed on the display surface of the display disposed in the downwardly inclined attitude under the image-forming optical element provided in light-transmissive fashion in the upper surface of the enclosure through the image-forming optical element as the spatial image standing up obliquely in the virtual display area defined in space over the enclosure in corresponding relation to the display surface to exhibit the spatial image in conjunction with the at least one exhibition object disposed on the upper surface of the enclosure. The at least one exhibition object for reinforcing the three-dimensional effect of the spatial image is disposed and exhibited in the region other than the upper surface of the image-forming optical element in the upper surface of the enclosure and at a position (satisfying Equation (1) below) where the distance from the center of the virtual display area of the spatial image projected from the display to over the enclosure is not greater than the diagonal length of the virtual display area or the maximum diameter of the area.

$$L \leq X \quad (1)$$

where L is the shortest distance between the center of the virtual display area and the at least one exhibition object, and X is a longer one of the diagonal length of the virtual display area and the maximum diameter of the virtual display area.

Thus, this exhibition method is capable of displaying the video picture displayed on the display as the spatial image richer in three-dimensional effect and in sense of realism in association with the at least one exhibition object to effectively appeal the spatial image and the exhibition object to viewers such as consumers and customers.

The video picture exhibition method according to the present invention wherein the at least one exhibition object for reinforcing the three-dimensional effect includes a plurality of exhibition objects, and wherein, when viewed from a front side of the enclosure facing an upward inclination of the spatial image, at least one pair of the exhibition objects is disposed at left-hand and right-hand positions symmetrical to each other with respect to a center line of the virtual display area as viewed in a leftward/rightward direction increases the binocular parallax between the exhibition objects and the spatial image to improve the three-dimensional effect and the sense of realism of the spatial image because the number of objects compared with the spatial image is increased.

In the video picture exhibition method according to the present invention wherein at least one of pairs of the exhibition objects disposed symmetrically is placed and exhibited at positions forward of the spatial image image-formed over the enclosure and adjacent to an edge of the image-forming optical element, a lower part (base part) of the exhibition objects is close to a lower part of the spatial image, whereby the three-dimensional effect and the sense of realism of the spatial image are improved.

In particular, in the video picture exhibition method according to the present invention wherein the left-hand and right-hand exhibition objects disposed at the positions forward of the spatial image are positioned so as to conceal part of the spatial image as viewed from the front side of the enclosure facing the upward inclination of the spatial image, or a beam-like member or a bridge-like member for concealing part of the spatial image provides coupling between these exhibition objects, the three-dimensional effect of the spatial image is further improved because part of the exhibition objects conceals part of the spatial image.

In the video picture exhibition method according to the present invention wherein at least one of pairs of the exhibition objects disposed symmetrically is placed and exhibited at positions rearward of the spatial image image-formed over the enclosure and adjacent to an edge of the image-forming optical element, an upper part (upper end part) of the exhibition objects is close to an upper part of the spatial image. This is preferable because the three-dimensional effect and the sense of realism of the spatial image are improved.

In the video picture exhibition method according to the present invention wherein at least one of pairs of the exhibition objects disposed symmetrically is placed and exhibited at positions leftward and rightward of the spatial image image-formed over the enclosure and adjacent to edges of the image-forming optical element, left-hand and right-hand ends of the exhibition objects are close to left-hand and right-hand ends of the spatial image. This is preferable because the three-dimensional effect and the sense of realism of the spatial image are improved.

DESCRIPTION OF EMBODIMENTS

Next, embodiments according to the present invention will now be described in detail with reference to the drawings. It should be noted that the present invention is not limited to the embodiments.

Figure 1:
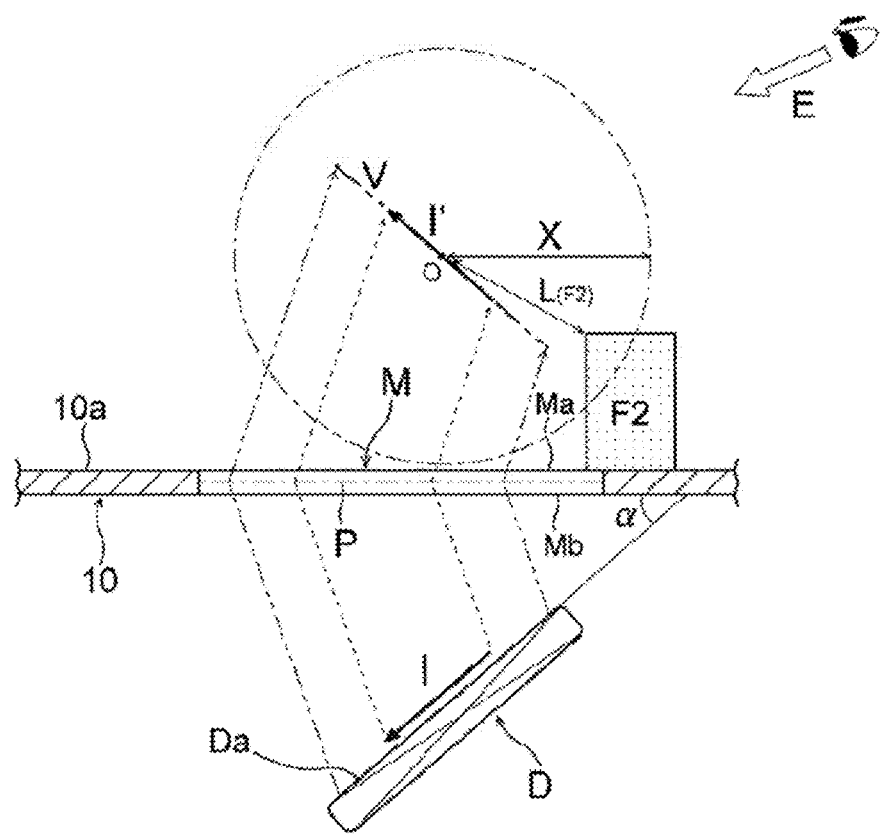
FIG. 1 is a partial sectional view illustrating a basic configuration of an exhibition device according to a first embodiment of the present invention.
Figure 2:
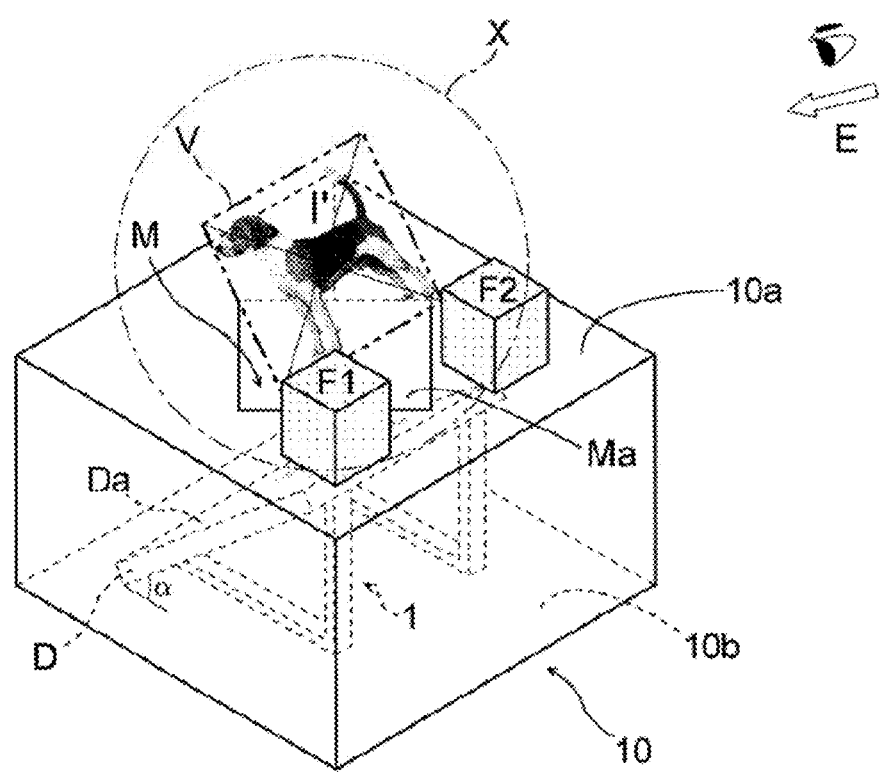
FIG. 2 is an external perspective view of the exhibition device according to the first embodiment of the present invention.

FIG. 1 is a view illustrating a basic configuration of an exhibition device according to a first embodiment of the present invention. FIG. 2 is an external perspective view of the exhibition device according to the first embodiment. In each figure, part of an enclosure such as a case and a housing, and components such as interconnect lines and electrical components are not shown for the purpose of briefly illustrating only the structure of principal parts of the exhibition device of the present invention. For ease of understanding, the thicknesses of an "image I" displayed on a display surface Da of a display D and a "spatial image I'" obtained by projecting the image I are shown in exaggeration although the images I and I' have no thicknesses in reality (two-dimensional plane).

As shown in FIG. 1, the exhibition device according to the present embodiment principally includes a panel-shaped micromirror array image-forming optical element (hereinafter referred to as a "micromirror array M" or simply as an "array M"), a flat panel display (hereinafter referred to as a "display D") such as an LCD, and a display mounting stand 1 for supporting this display D in an obliquely inclined attitude under the array M (inside a case 10). By using the reflection of light from a large number of micromirrors (corner reflectors; with reference to FIGS. 11 and 12) provided on the micromirror array M, this exhibition device forms a video picture (image I) displayed on the display D having the display surface Da disposed in an attitude inclined at a predetermined angle α with respect to one surface (lower surface Mb) of the array M as a spatial image I' standing up obliquely in space on the other surface (upper surface Ma) side of the array M in an upward floating manner.

As shown in FIG. 2, "exhibition objects for reinforcing the three-dimensional effect of the spatial image I'" (front exhibition objects F1 and F2) are placed on an upper surface 10a of the case 10 in the exhibition device. Each of the front exhibition objects F1 and F2 is disposed at a position where a distance (shortest distance) L from the center (point O; with reference to FIG. 1) of a virtual display area V of the spatial image I' thereto is not greater than a diagonal length X of the virtual display area V (L≤X). This is a characteristic of the exhibition device according to the present invention.

The exhibition objects for reinforcing the three-dimensional effect of the spatial image I' are placed in a region other than the upper surface Ma of the array M so as not to cover the array M for the purpose of not hindering the image formation by means of the micromirror array M. Although it is difficult to understand from the figures, a set of points (drawn by a dot-dash line X in the figures) satisfying the condition that the distance from the center (point O) of the virtual display area V (two-dimensional plane) is equal to the "diagonal length X of the virtual display area V" is a sphere having a center at the point O.

The arrangement of the exhibition objects in the exhibition device will be described in detail. As shown in FIG. 2, the exhibition device according to first embodiment includes the plurality of exhibition objects (F1 and F2). When viewed from the front side of the case facing the upward inclination of the spatial image I' (eyepoint E side of a viewer on the right-hand side shown), the front exhibition objects F1 and F2 are disposed in a pair at left-hand and right-hand positions symmetrical to each other with respect to a center line of the virtual display area V as viewed in a leftward/rightward direction of the case and at positions closer to the viewer than the spatial image I'.

Figure 18:
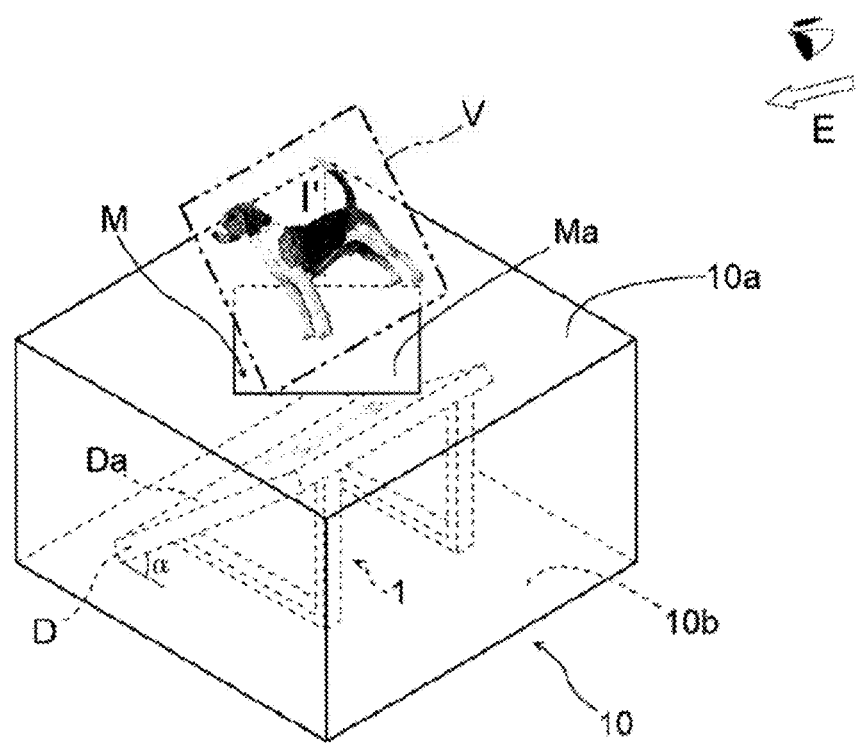
FIG. 18 is an external perspective view of a conventional display device.

Thus, when the spatial image I' is displayed over the case 10 (micromirror array M) by displaying the image I on the display D, binocular parallax larger than that caused in the absence of the exhibition objects is caused between the spatial image I' and the exhibition objects because the objects (exhibition objects F1 and F2) which come into a field of view at the same time with the spatial image I' are present near the spatial image I'. Thus, the exhibition device according to the present embodiment and a video picture exhibition method employing the same provide improvements in the three-dimensional effect and the sense of realism of the spatial image I', as compared with the conventional display device (FIG. 18 and the like).

Figure 3:
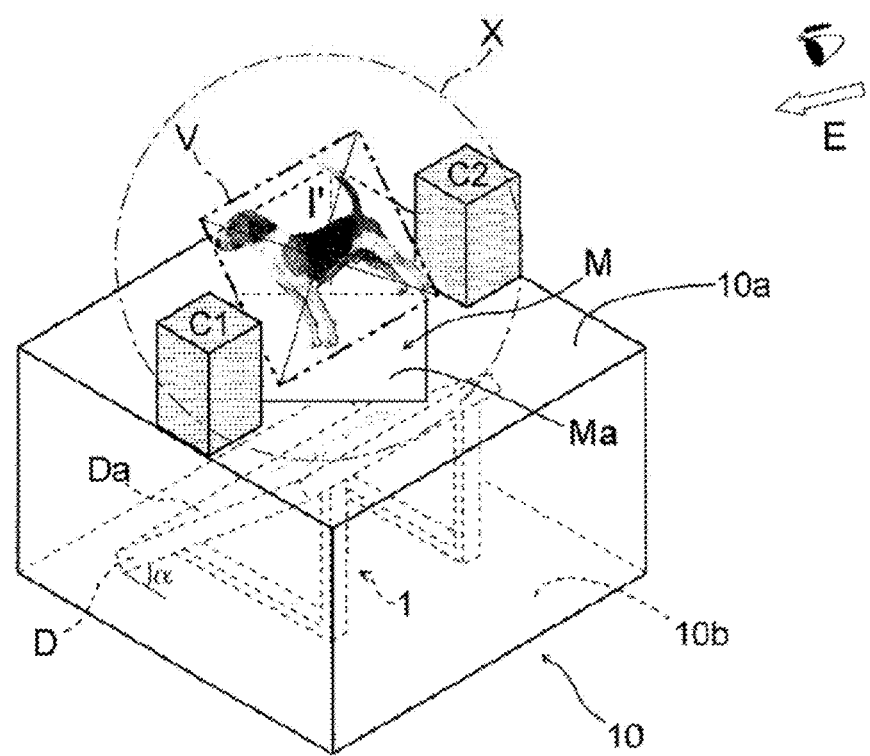
FIG. 3 is an external perspective view of the exhibition device according to a second embodiment of the present invention.
Figure 4:
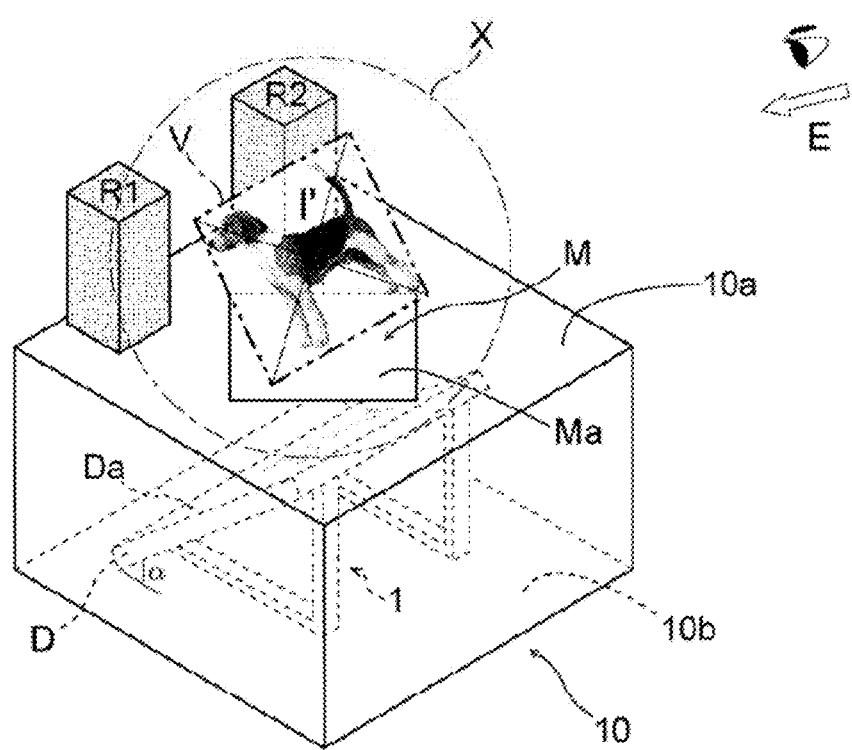
FIG. 4 is an external perspective view of the exhibition device according to a third embodiment of the present invention.

FIG. 3 shows an example (second embodiment) in which exhibition objects (middle exhibition objects C1 and C2) for reinforcing the three-dimensional effect are disposed to the left and right of the spatial image I' as viewed from the viewer (E). FIG. 4 shows an example (third embodiment) in which exhibition objects (rear exhibition objects R1 and R2) are disposed behind the spatial image I' as viewed from the viewer (E).

In the second embodiment (FIG. 3), the middle exhibition objects C1 and C2 are also disposed in a pair at left-hand and right-hand positions symmetrical to each other with respect to the center line of the virtual display area V as viewed in the leftward/rightward direction of the case. Thus, when the spatial image I' is displayed over the case 10 (micromirror array M), binocular parallax is caused between the spatial image I' and the exhibition objects because the actual objects (exhibition objects C1 and C2) are present near the spatial image I'. This provides improvements in the three-dimensional effect and the sense of realism of the spatial image I', as compared with the conventional display device.

In the third embodiment (FIG. 4), the rear exhibition objects R1 and R2 are disposed in a pair at left-hand and right-hand positions symmetrical to each other with respect to the center line of the virtual display area V as viewed in the leftward/rightward direction of the case and at rear positions farther than the spatial image I'. In this case, when the spatial image I' is displayed over the case 10 (micromirror array M), binocular parallax is caused between the spatial image I' and the rear exhibition objects R1 and R2, and the rear exhibition objects R1 and R2 provide a backdrop for the spatial image I'. This provides further improvements in the three-dimensional effect and the sense of realism of the spatial image I'.

Figure 5:
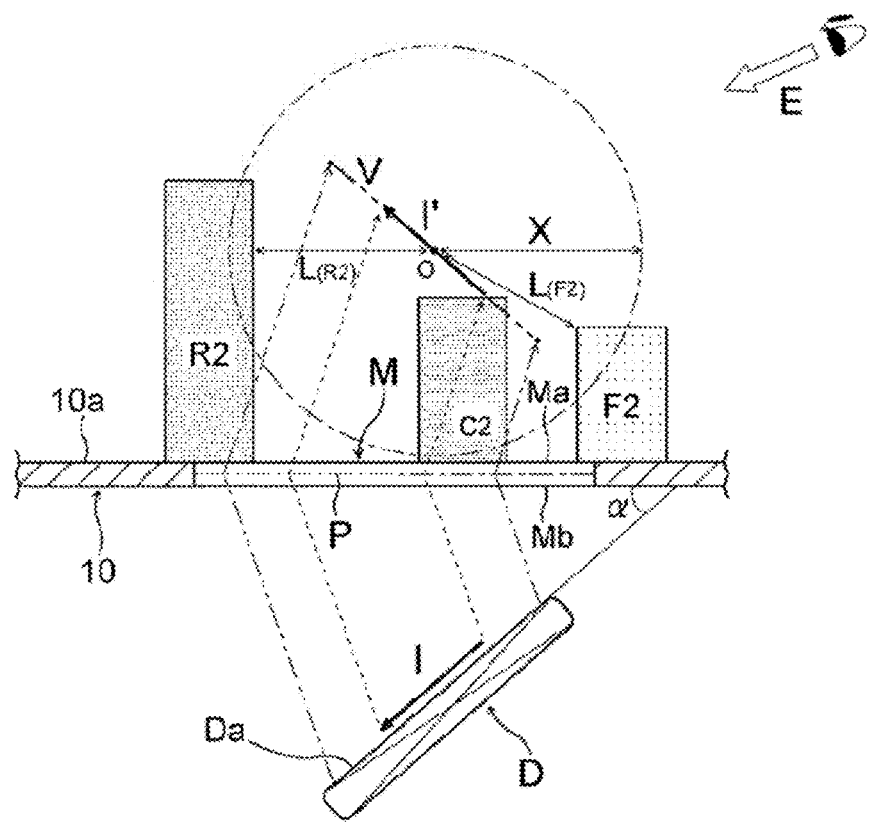
FIG. 5 is a partial sectional view illustrating a basic configuration of the exhibition device according to a fourth embodiment of the present invention.
Figure 6:
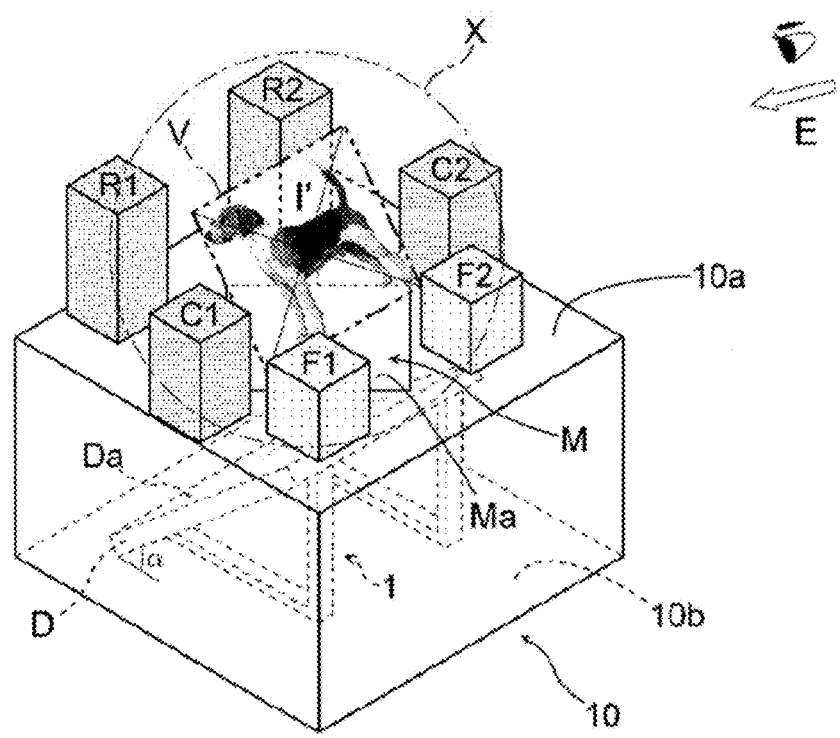
FIG. 6 is an external perspective view of the exhibition device according to the fourth embodiment of the present invention.

FIGS. 5 and 6 show an example (fourth embodiment) in which all of the front exhibition objects F1 and F2, the middle exhibition objects C1 and C2 and the rear exhibition objects R1 and R2 are disposed on the upper surface 10a of the case 10. These exhibition objects F1, F2, C1, C2, R1 and R2 are disposed at positions where the distance L from the center (point O) of the virtual display area V of the spatial image I' thereto is not greater than the diagonal length X of the virtual display area V (L≤X) so as to surround the spatial image I'.

The aforementioned configuration also displays the projected spatial image I' in a circular space defined by the exhibition objects F1, F2, C1, C2, R1 and R2 to thereby provide further improvements in the three-dimensional effect and the sense of realism of the spatial image I', as compared with the conventional display device. In addition, distances (gaps) between the exhibition objects F1, F2, C1, C2, R1 and R2, shade and shadow produced by the exhibition objects F1, F2, C1, C2, R1 and R2 and the like cause a higher degree of (more complicated) binocular parallax. Thus, the exhibition device according to the present embodiment and the video picture exhibition method employing the same provide further improvements in the three-dimensional effect and the sense of realism of the spatial image I'.

In the aforementioned embodiments, objects in the shape of a rectangular parallelepiped (columnar shape) are illustrated as a model of the exhibition objects disposed on the upper surface of the enclosure (case 10). However, the exhibition objects used herein may be three-dimensional objects which are made of resin, metal, ceramic, paper and the like and each of which a user can hold in his/her hand. Examples of such three-dimensional objects include character goods such as mascots and figures, models and miniatures of vehicles, buildings, animals, plants, celestial bodies and the like in addition to typical commodities (small articles).

Next, fifth to eighth embodiments shown in FIGS. 7 to 10 are examples in which at least one beam-like or bridge-like member for concealing part of the spatial image I' is used to provide coupling between the exhibition objects in the shape of a rectangular parallelepiped (columnar shape) as described above.

Figure 7:
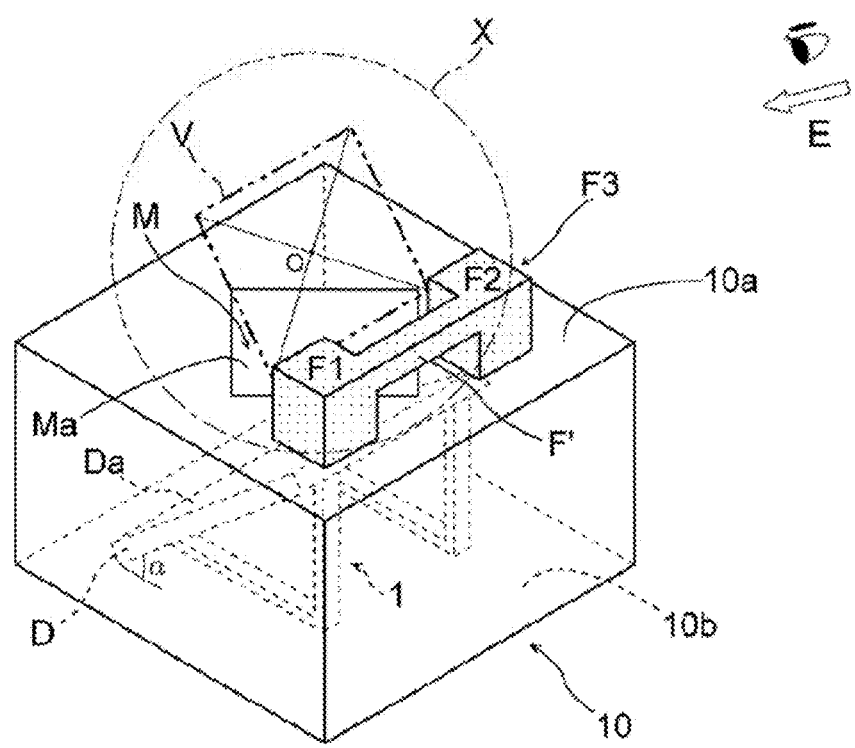
FIG. 7 is an external perspective view of the exhibition device according to a fifth embodiment of the present invention.

For example, in the fifth embodiment shown in FIG. 7, an exhibition object F3 disposed on the upper surface 10a of the case 10 is formed in such a manner that a beam-like member (F') or a bridge-like member provides coupling between upper parts of the front exhibition objects F1 and F2 having a columnar shape. When viewed from the front side of the case facing the upward inclination of the spatial image I' (eyepoint E side of a viewer on the right-hand side shown), the beam-like member F' is positioned so as to conceal part of the spatial image I' or part of the upper surface Ma of the array. The viewer can see part (front corner) of the micromirror array M through an opening defined between the beam-like member F' of the exhibition object F3 and the upper surface 10a of the case 10.

Figure 8:
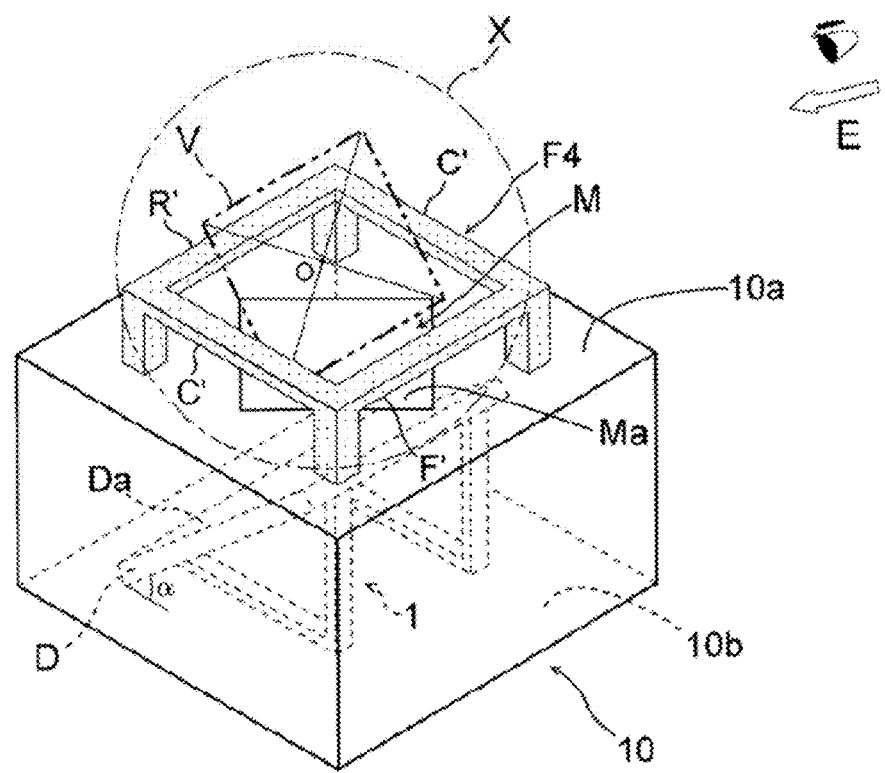
FIG. 8 is an external perspective view of the exhibition device according to a sixth embodiment of the present invention.

In the sixth embodiment shown in FIG. 8, an exhibition object F4 disposed on the upper surface 10a of the case 10 is in the form of a frame as a whole in such a manner that upper parts of the front and rear exhibition objects (two front and two rear exhibition objects) having a columnar shape are spanned by beam-like members (F', C', C' and R') providing coupling therebetween. In the exhibition object F4 in the form of a frame as in the exhibition object F3, the front beam-like member F' is positioned so as to conceal part of the spatial image I' or part of the upper surface Ma of the array, when viewed from the front side of the case (eyepoint E side of a viewer on the right-hand side shown). The viewer can see part (front corner) of the micromirror array M through an opening defined between the front beam-like member F' of the exhibition object F4 and the upper surface 10a of the case.

Figure 9:
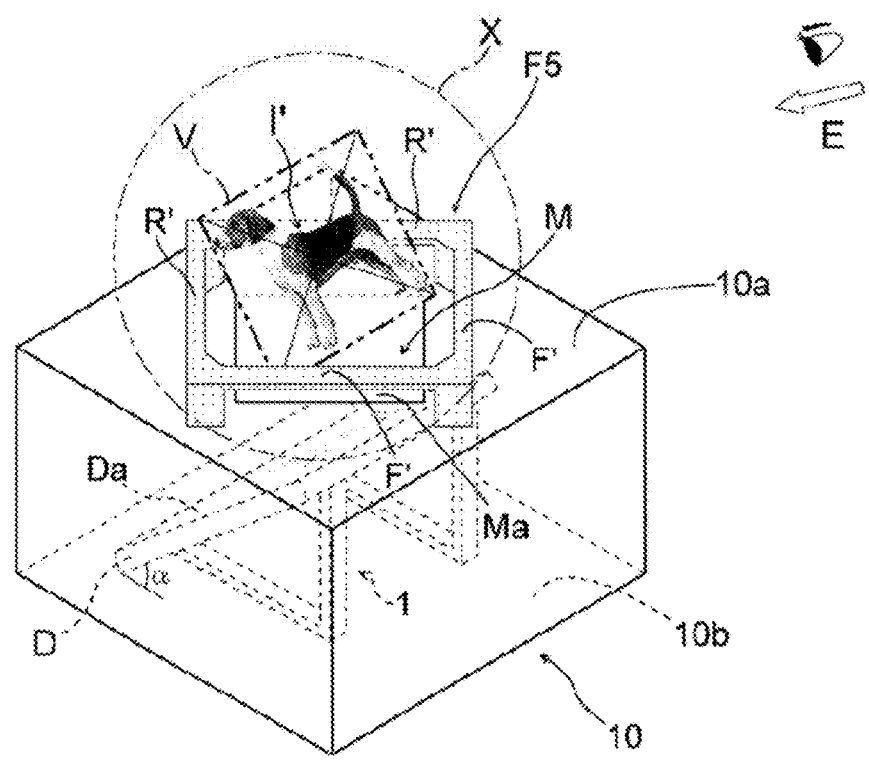
FIG. 9 is an external perspective view of the exhibition device according to a seventh embodiment of the present invention.

In the seventh embodiment shown in FIG. 9, an exhibition object F5 in the form of a frame which is similar to the exhibition object F4 is disposed along the outer peripheral shape of the micromirror array M (upper surface Ma). The exhibition object F5 is in the form of a frame as a whole in such a manner that upper parts of four columnar members are spanned by beam-like members (F', F', R' and R') providing coupling therebetween. The exhibition object F5 in the form of a frame differs from the exhibition objects F3 and F4 in that the beam-like members F', F', R' and R' are positioned so as not to conceal the spatial image I' (not to hinder the projection thereof), when viewed from the eyepoint E side of a viewer (on the right-hand side shown).

Figure 10:
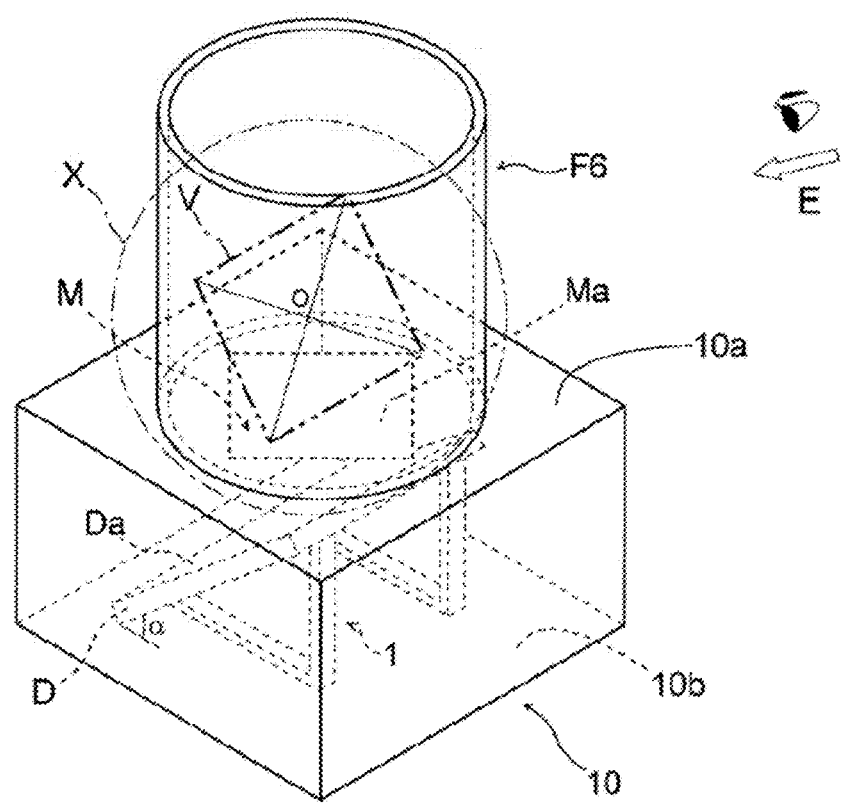
FIG. 10 is an external perspective view of the exhibition device according to an eighth embodiment of the present invention.

In the eighth embodiment shown in FIG. 10, an exhibition object F6 disposed on the upper surface 10a of the case 10 is formed in a hollow cylindrical shape. The exhibition object F6 is made of a transparent or semi-transparent resin and the like. The exhibition object F6 is configured to enable a viewer to see the spatial image I' through the peripheral surface (side surface) thereof. Like the exhibition objects F3 to F5, this exhibition object F6 is, of course, positioned and placed in a region other than the upper surface Ma of the array M and at least partially positioned and placed at a position where the distance L from the center (point O) of the virtual display area V of the spatial image I' thereto is not greater than the diagonal length X of the virtual display area V (L≤X).

According to the aforementioned configurations of the fifth to eighth embodiments, an object (part of each of the exhibition objects) which comes into a field of view at the same time with the spatial image I' is present near the spatial image I', when the spatial image I' is displayed over the case 10 (micromirror array M). Thus, the exhibition device according to these embodiments and the video picture exhibition method employing the same cause binocular parallax larger than that caused in the absence of the exhibition objects and the like between the spatial image I' and each of the exhibition objects. This provides improvements in the three-dimensional effect and the sense of realism of the spatial image I'.

Figure 11:
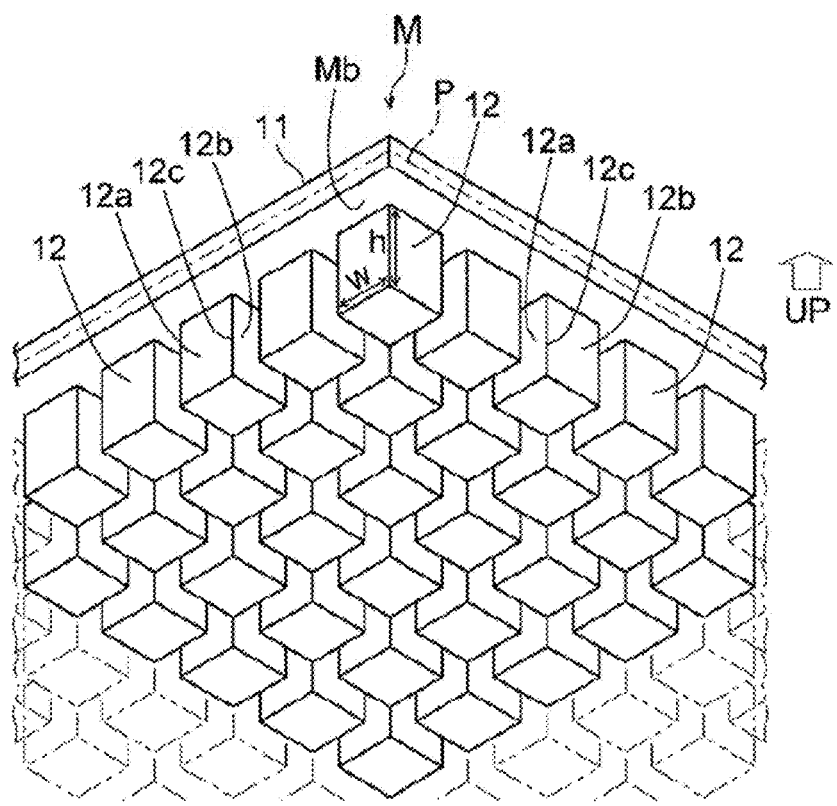
FIG. 11 is a view illustrating a structure of a micromirror array for use in the exhibition device.
Figure 12:
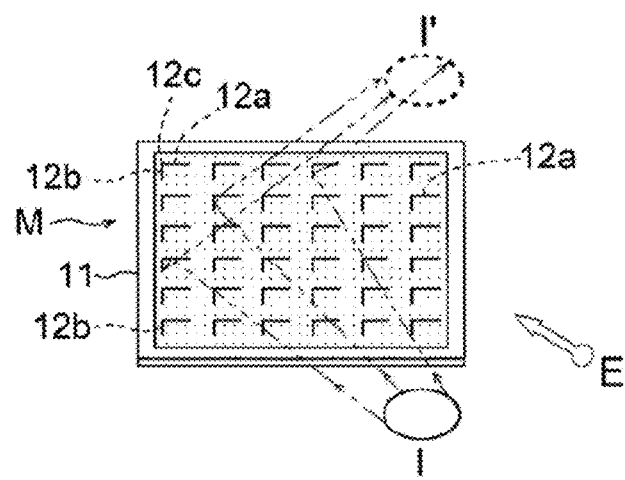
FIG. 12 is a view illustrating a method of projecting a spatial image by means of the micromirror array.

Next, examples of the image-forming optical element for use in the exhibition device according to the present invention include refraction type image-forming elements such as various lenses including Fresnel lenses and the like, micromirrors of afocal optical systems, and corner reflectors. Of these, the micromirror array M (protruding corner reflector array) which forms an image at a position symmetrical thereto with respect to the plane of an element surface P, as shown in FIG. 11, is preferably used in the aforementioned embodiments. This micromirror array M is disposed substantially horizontally with respect to the eyepoint (sense) of a viewer by means of a given fixing member and the like.

The micromirror array (corner reflector array) M will be described in further detail. As shown in FIG. 11, this micromirror array M includes a multiplicity of downwardly protruding minute unit optical elements 12 (corner reflectors) in the shape of quadrangular prisms which are provided on the lower surface Mb side of a substrate (base) 11 and arranged in a diagonal checkerboard pattern (although FIG. 11 is a view of the array M as seen in an upward direction from below).

Each of the unit optical elements 12 in the shape of quadrangular prisms in the micromirror array M has a pair of (two) light reflecting surfaces (a first side surface 12a and a second side surface 12b on the lateral sides of the quadrangular prism) constituting a corner reflector. Each of the light reflecting surfaces is of a rectangular shape having the "ratio of the length (height h) as measured in the direction of the thickness of the substrate to the width (width w) as measured in the direction of the surface of the substrate" [aspect ratio (h/w)] of not less than 1.5.

The pair of light reflecting surfaces (the first side surface 12a and the second side surface 12b) which form a corner 12c of each of the unit optical elements 12 are designed to face toward the eyepoint of the viewer (right-hand side indicated by the reference character E). The unit optical elements 12 are disposed, with the outer edges thereof rotated 45° with respect to the front of the viewer. The image I under the micromirror array M is projected onto a position (over the image-forming optical element) symmetrical thereto with respect to the plane of the array M (element surface P), so that the spatial image I' is formed.

One or two optical elements (micromirror arrays M1, M2, M3 and M4 with reference to FIGS. 13 to 17) obtained by forming a plurality of parallel linear grooves spaced at predetermined intervals by dicing using a rotary blade in a surface of a flat-shaped transparent substrate, in addition to the micromirror array M having the aforementioned structure, may be used as the panel-shaped image-forming optical element for the exhibition device according to the present invention.

Figure 16:
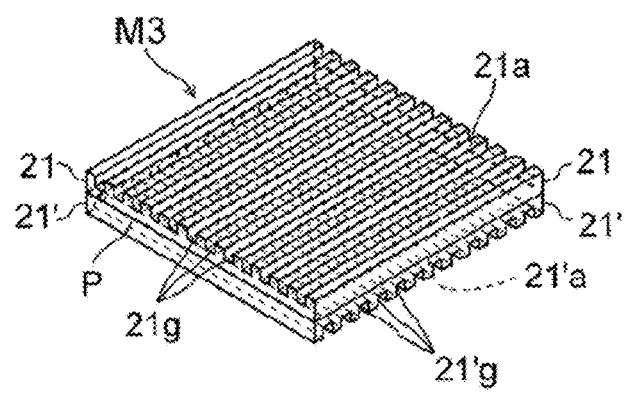
FIG. 16 shows a further example of the structure of the micromirror array for use in the exhibition device according to the present invention.
Figure 17:
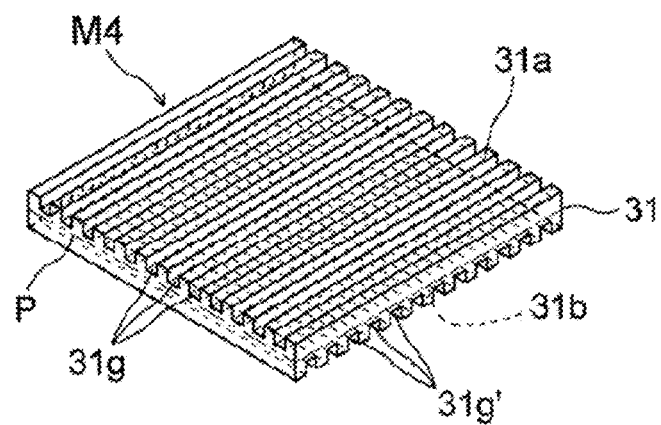
FIG. 17 is a view illustrating the configuration of the micromirror array having a different structure for use in the exhibition device according to the present invention.

In these micromirror arrays M1, M2, M3 and M4, the two optical elements (substrates) having the plurality of parallel grooves formed in the front surfaces thereof are laid one on top of the other, with one of the optical elements rotated through 90° (FIGS. 13, 14, 15 and 16), or the one flat-shaped substrate has the plurality of parallel grooves formed in the front and back surfaces thereof so as to be orthogonal to each other as seen in plan view (FIG. 17). As a result, when viewed in the direction of the front and back surfaces of the substrate(s) (in a vertical direction), corner reflectors are formed respectively at the intersections (points of intersection of a lattice) of a first group of parallel grooves and a second group of parallel grooves which are orthogonal to each other as seen in plan view. The corner reflectors are comprised of light-reflective vertical surfaces (wall surfaces) of the first group of parallel grooves, and light-reflective vertical surfaces (wall surfaces) of the second group of parallel grooves.

The light-reflective wall surfaces of the first group of parallel grooves of the substrate and the light-reflective wall surfaces of the second group of parallel grooves of the substrate which constitute the aforementioned corner reflectors are what is called in "skew" relation when viewed three-dimensionally. It is also advantageous that the adjustment of the optical performance of the optical elements, such as an increase in aspect ratio [height (length as measured in the direction of the thickness of the substrate)/width (width as measured in a horizontal direction of the substrate)] of the light reflecting surfaces of the corner reflectors, is made relatively easily because the parallel grooves and the light-reflective wall surfaces thereof are formed by dicing using a rotary blade.

Figure 13:
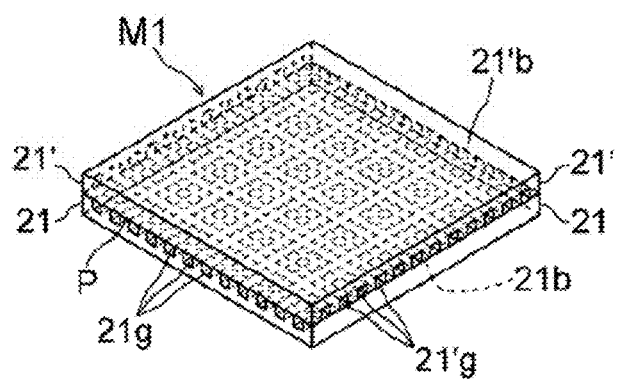
FIG. 13 is a view illustrating another example of the structure of the micromirror array for use in the exhibition device according to the present invention.
Figure 14:
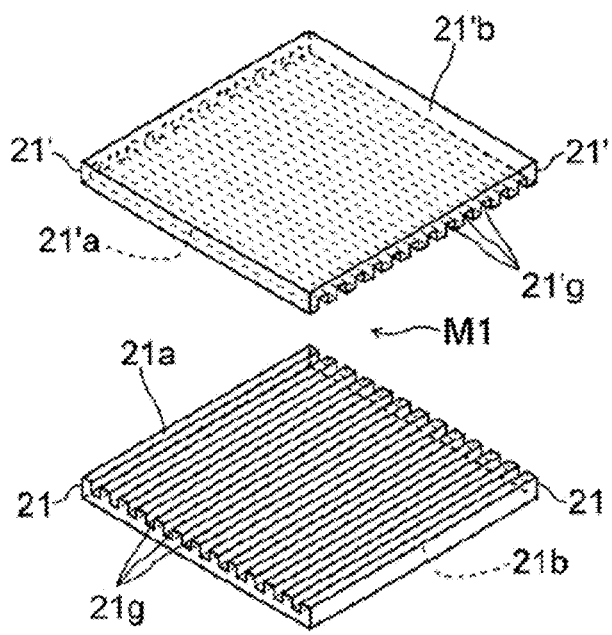
FIG. 14 is an exploded perspective view illustrating the configuration of the micromirror array.

The structures of the aforementioned micromirror arrays will be described individually in further detail. Optical elements (21 and 21') constituting the micromirror array M1 shown in FIGS. 13 and 14 are configured such that a plurality of parallel linear grooves 21g and grooves 21'g spaced at predetermined intervals are formed by dicing using a rotary blade in upper surfaces 21a and 21'a of flat-shaped transparent substrates 21 and 21'.

The micromirror array M1 is formed using the two optical elements (substrates 21 and 21') identical in shape. As shown in FIG. 14, with the first upper substrate 21' flipped upside down and rotated 90° relative to the second lower substrate 21 (in a plane), the front surface 21'a of the upper substrate 21' where the grooves 21'g are formed is brought into abutment with the front surface 21a of the lower substrate 21 where the grooves 21g are formed. These substrates 21 and 21' are vertically laid one on top of the other and fixed together to constitute the single array M1 (FIG. 13) in which the continuous directions of the grooves 21g and the grooves 21'g provided in the substrates 21 and 21' are orthogonal to each other as seen in plan view.

Figure 15:
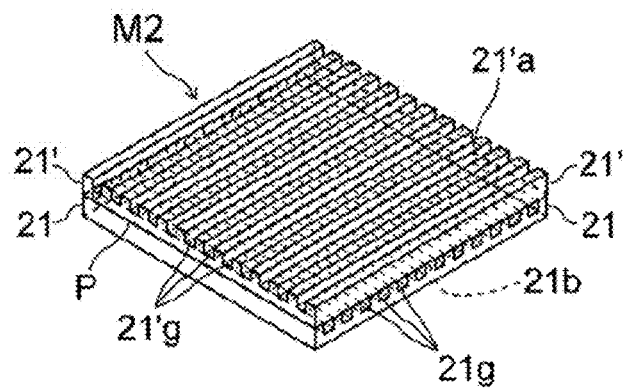
FIG. 15 shows still another example of the structure of the micromirror array for use in the exhibition device according to the present invention.

The micromirror array M2 shown in FIG. 15 is formed in a similar manner. With the first upper substrate 21' rotated (90° in a horizontal plane) relative to the second lower substrate 21 so that the continuous directions of the grooves 21g and the grooves 21'g provided in the substrates 21 and 21' are orthogonal to each other as seen in plan view, a back surface 21'b (where the grooves 21'g are not formed) of the upper substrate 21' is brought into abutment with the front surface 21a of the lower substrate 21 where the grooves 21g are formed. These substrates 21 and 21' are vertically laid one on top of the other and fixed together to constitute the single array M2.

Further, the micromirror array M3 shown in FIG. 16 is formed using the two optical elements (substrates 21 and 21') identical in shape and in manufacturing method with those described above. With the first lower substrate 21' flipped upside down and rotated 90° (horizontally) relative to the second upper substrate 21, a back surface 21b of the upper substrate 21 and the back surface 21'b of the lower substrate 21' are brought into abutment with each other. These substrates 21 and 21' are vertically laid one on top of the other and fixed together to constitute the single array M3 in which the continuous directions of the grooves 21g and the grooves 21'g provided in the substrates 21 and 21' are orthogonal to each other as seen in plan view.

The micromirror array M4 shown in FIG. 17 is configured such that a plurality of parallel linear grooves 31g and grooves 31g' spaced at predetermined intervals are formed by dicing using a rotary blade in an upper front surface 31a and a lower back surface 31b, respectively, of a flat-shaped transparent substrate 31. The formation directions (continuous directions) of the grooves 31g on the front surface 31a side and the grooves 31g' on the back surface 31b side are orthogonal to each other as see in plan view.

Like the exhibition device including the micromirror array M, an exhibition device including each of the micromirror arrays M1, M2, M3 and M4 is also capable of displaying (projecting) the planar two-dimensional image I (video picture and the like) displayed on the display D as a pseudo-three-dimensional image having a sense of depth (two-dimensional image appearing three-dimensional, spatial image I'). Further, the aforementioned exhibition device is advantageous in that the costs of the entire device are reduced because the micromirror arrays (M1, M2, M3 and M4) used therein are less costly.

Next, as shown in FIGS. 1 and 5, the flat panel display (display D) which displays the image I in the exhibition device according to the present invention is disposed so as to be inclined downwardly from the front side (front E side) of the viewer toward the rear side at a predetermined inclination angle α with respect to the lower surface Mb of the micromirror array M, so that the spatial image I' projected through the micromirror array M faces toward the viewer.

Examples of the display D for use in displaying the image I may include display panels capable of reproducing "white" as balanced as possible over all visible wavelengths and "black" when in a non-display state with good contrast, such as plasma display panels and organic EL display panels, in addition to liquid crystal display panels (LCDs) with backlights. The display D may be a display part for a cellular mobile phone, a personal digital assistant and the like. Specifically, normally exposed (uncovered) type display parts (Display D) for smartphones, tablet PCs, digital photo frames, portable game machines, portable book readers, PDAs, electronic dictionaries and the like in which the dimensions of the display surface Da thereof correspond to the size (planar shape) of the micromirror array M may be used as the display D.

The inclination angle α of the display D is not less than 30° and less than 90° (30°≤α<90°) in consideration for the attitude, distance and the like of the viewer that uses this exhibition device.

For illustration in the aforementioned embodiments, the box-like case 10 is used as the enclosure for housing the display D. However, the enclosure for use in the exhibition device according to the present invention may have any shape, as long as the enclosure includes an upper surface (top plate member) having space for placing an exhibition object thereon. Examples of such an enclosure include a case having other shapes and an open type housing.

EXAMPLES

Next, an example will be described in which some of the exhibition devices having the configurations of the respective embodiments described above were selected, so that "the effectiveness of improvement in the three-dimensional effect of a spatial image" which was produced by exhibition objects disposed on an upper surface of a device was verified by comparison with a display device having a conventional configuration (configuration of FIG. 18 having no exhibition objects).

Comparative Example (display device) and Inventive Examples (exhibition devices) used in the aforementioned verification were identical in conditions such as the configuration and shape of an image-forming optical element, a display and an enclosure, video images appearing on the display, and ambient environments except the exhibition object(s) disposed on the upper surface of the device. Ten test subjects (monitors) taken at random from those who have never seen these devices conducted a sensory evaluation as to "which display appeared more three-dimensional as compared with the device of Comparative Example".

The configurations of the exhibition devices (display device) used for the evaluation are as follows:
Comparative Example 1: the conventional display device (no exhibition objects) described in FIG. 18.

Inventive Example 1: the exhibition device (exhibition objects F1 and F2) described in the first embodiment (FIG. 2).

Inventive Example 2: the exhibition device (exhibition objects F1, F2, C1, C2, R1 and R2) described in the fourth embodiment (FIG. 6).

Inventive Example 3: the exhibition device (exhibition object F5) described in the seventh embodiment (FIG. 9).

Results of the sensory evaluation were as follows:
Ten out of the ten test subjects answered that they felt a more three-dimensional effect of the spatial image in the device of Inventive Example 1 than in the device of Comparative Example 1.

Ten out of the ten test subjects answered that they felt a more three-dimensional effect of the spatial image in the device of Inventive Example 2 than in the device of Comparative Example 1.

Ten out of the ten test subjects answered that they felt a more three-dimensional effect of the spatial image in the device of Inventive Example 3 than in the device of Comparative Example 1.

In this manner, all of the participating monitors answered that they felt a more three-dimensional effect in every device of Inventive Examples than in the device of Comparative Example. This showed that the exhibition devices according to the present invention were very high in effectiveness.

Although specific forms in the present invention have been described in the aforementioned example, the aforementioned example should be considered as merely illustrative and not restrictive. It is contemplated that various modifications evident to those skilled in the art could be made without departing from the scope of the present invention.

The exhibition device according to the present invention and the video picture exhibition method employing the same are suitable for projection of a moving picture associated with a three-dimensional object around the three-dimensional object, and are preferable for use in exhibition and display of dioramas, plastic models, solid models, garage kits, paper models, minicars, candy toys, figures and the like. Also, the exhibition device according to the present invention and the video picture exhibition method employing the same may be used in academic and educational fields such as imaging of the structures of chemical substances difficult to represent by the use of only three-dimensional models, in addition to commercial use using characters, merchandise models and the like.

REFERENCE SIGNS LIST

1 Display mounting stand
10 Case
10a Upper surface
11 Substrate
12 Unit optical elements
12a and 12b Side surfaces
12c Corners
21 and 21' Substrates
21a and 21'a Front surfaces
21b and 21'b Back surfaces
21g and 21'g Grooves
31 Substrate
31a Front surface
31b Back surface
31g and 31g' Grooves
D Display Da Display surface
F, C and R Exhibition objects
M Micromirror array
Ma Upper surface
Mb Lower surface
I Image
I' Spatial image
V Virtual display area of spatial image
X Diagonal length of virtual display area
L Distance between exhibition object and center of virtual display area

The invention claimed is:

1. An exhibition device comprising:
an image-forming optical element in an upper surface of an enclosure for housing a display, the image-forming optical element being light-transmissive;
a display disposed under the image-forming optical element and including a display surface in an attitude inclined at a predetermined angle with respect to a lower surface of the image-forming optical element; and
at least one exhibition object disposed on the upper surface of the enclosure,
wherein the exhibition device image-forms an image displayed on the display surface of the display through the image-forming optical element as a spatial image standing up obliquely in a virtual display area defined at a spatial position symmetrical to the display surface, with respect to a plane of an element surface of the image-forming optical element, thereby displaying the spatial image in association with the at least one exhibition object,
wherein the at least one exhibition object on the upper surface of the enclosure is disposed in a region other than the upper surface of the image-forming optical element and at a position satisfying $$L \le X \qquad (1)$$

where L is a shortest distance between the center of the virtual display area and the at least one exhibition object, and X is a longer one of a diagonal length of the virtual display area and a maximum diameter of the virtual display area.

2. The exhibition device according to claim 1, wherein the at least one exhibition object includes a plurality of exhibition objects, and at least one pair of the exhibition objects is disposed at left-hand and right-hand positions symmetrical to each other with respect to a center line of the virtual display area, as viewed in a leftward/rightward direction.

3. The exhibition device according to claim 1, wherein the image-forming optical element is a micromirror array including corner reflector type unit optical elements.

4. The exhibition device according to claim 1, wherein the inclination angle of the display surface of the display is not less than 30° and less than 90°, with respect to the lower surface of the image-forming optical element.

5. A method of exhibiting a video picture, comprising:
image-forming an image displayed on a display surface of a display disposed in a downwardly inclined attitude under an image-forming optical element in an upper surface of an enclosure, the image-forming optical element being light-transmissive, through the image-forming optical element, as a spatial image standing up obliquely in a virtual display area defined in space over the enclosure in corresponding relation to the display surface, thereby exhibiting the spatial image in conjunction with at least one exhibition object disposed on the upper surface of the enclosure,
wherein the at least one exhibition object reinforces the three-dimensional effect of the spatial image and is disposed and exhibited in a region other than the upper surface of the image-forming optical element in the upper surface of the enclosure so as to satisfy $$L \le X \qquad (1)$$

where L is a shortest distance between the center of the virtual display area and the at least one exhibition object, and X is a longer one of a diagonal length of the virtual display area and a maximum diameter of the virtual display area.

6. The method according to claim 5,
wherein the at least one exhibition object includes a plurality of exhibition objects, and
wherein, when viewed from a front side of the enclosure facing an upward inclination of the spatial image, at least one pair of the exhibition objects is disposed at left-hand and right-hand positions symmetrical to each other with respect to a center line of the virtual display area as viewed in a leftward/rightward direction.

7. The method according to claim 6, wherein the at least one of pair of the exhibition objects disposed symmetrically is placed and exhibited at positions forward of the spatial image image-formed over the enclosure and adjacent to an edge of the image-forming optical element.

8. The method according to claim 7, wherein the left-hand and right-hand exhibition objects disposed at the positions forward of the spatial image are positioned so as to conceal part of the spatial image as viewed from the front side of the enclosure facing the upward inclination of the spatial image, or wherein a beam or bridge member for concealing part of the spatial image provides coupling between the at least one pair of exhibition objects.

9. The method according to claim 6, wherein the at least one of pairs of the exhibition objects disposed symmetrically is placed and exhibited at positions rearward of the spatial image image-formed over the enclosure and adjacent to an edge of the image-forming optical element.

10. The method according to claim 6, wherein the at least one of pairs of the exhibition objects disposed symmetrically is placed and exhibited at positions leftward and rightward of the spatial image image-formed over the enclosure and adjacent to edges of the image-forming optical element.

11. An exhibition device comprising:
an image-forming optical element in an upper surface of an enclosure for housing a display, the image-forming optical element being light-transmissive;
a display mounting stand for mounting the display disposed under the image-forming optical element, the display including a display surface in an attitude inclined at a predetermined angle with respect to a lower surface of the image-forming optical element; and
at least one exhibition object disposed on the upper surface of the enclosure,
wherein the exhibition device image-forms an image displayed on the display surface of the display through the image-forming optical element as a spatial image standing up obliquely in a virtual display area defined at a spatial position symmetrical to the display surface, with respect to a plane of an element surface of the image-forming optical element, thereby displaying the spatial image in association with the at least one exhibition object, wherein the at least one exhibition object on the upper surface of the enclosure is disposed in a region other than the upper surface of the image-forming optical element and at a position satisfying $$L \leq X \quad (1)$$

where L is a shortest distance between the center of the virtual display area and the at least one exhibition object, and X is a longer one of a diagonal length of the virtual display area and a maximum diameter of the virtual display area.

* * * * *